United States Patent [19]

DiGiacomo

[11] Patent Number: 4,481,087

[45] Date of Patent: Nov. 6, 1984

[54] PROCESS FOR REMOVING CHROMATE FROM SOLUTION

[75] Inventor: Peter M. DiGiacomo, Mission Viejo, Calif.

[73] Assignee: Occidental Chemical Corporation, Niagara Falls, N.Y.

[21] Appl. No.: 334,011

[22] Filed: Dec. 23, 1981

[51] Int. Cl.$^3$ .............................................. C25G 1/26
[52] U.S. Cl. ...................................... 204/95; 210/684
[58] Field of Search ....................... 210/684, 686, 688; 204/95

[56] References Cited

U.S. PATENT DOCUMENTS

| | | | |
|---|---|---|---|
| 3,332,737 | 7/1967 | Kraus | 210/686 |
| 3,382,034 | 5/1968 | Kraus | 210/684 |
| 3,664,950 | 5/1972 | Saraceno et al. | 210/35 |
| 3,835,001 | 9/1974 | O'Brien | 204/95 |
| 3,835,042 | 9/1974 | Lalacentie et al. | 210/28 |
| 3,885,018 | 5/1975 | Smith | 204/51 |
| 3,903,237 | 9/1975 | Smith et al. | 204/51 |
| 4,049,772 | 9/1977 | Shunsuke et al. | 423/54 |
| 4,145,281 | 3/1979 | Weishaar et al. | 210/684 |

OTHER PUBLICATIONS

Surface Ionization and Complexation at the Oxide/Water Interface, J. of Colloid & Interface Sc., vol. 67, No. 1, Oct. 15, 1978, pp. 90–107.
Surface Ionization and Complexation at the Oxide/Water Interface J. of Colloid & Interface Sc., vol. 74, No. 1, Mar. 1980, pp. 32–42.

*Primary Examiner*—R. L. Andrews
*Attorney, Agent, or Firm*—James F. Tao; William G. Gosz

[57] ABSTRACT

A process for removing dissolved chromium from a solution wherein said chromium is in the anion form which comprises contacting said solution with an adsorbent, comprising a hydrous oxide of iron at conditions whereby said chromium is adsorbed on said hydrous oxide, and wherein said hydrous oxide of iron is a granular, porous, high surface area, substantially non-crystalline, black material.

15 Claims, 4 Drawing Figures

FIG. 1
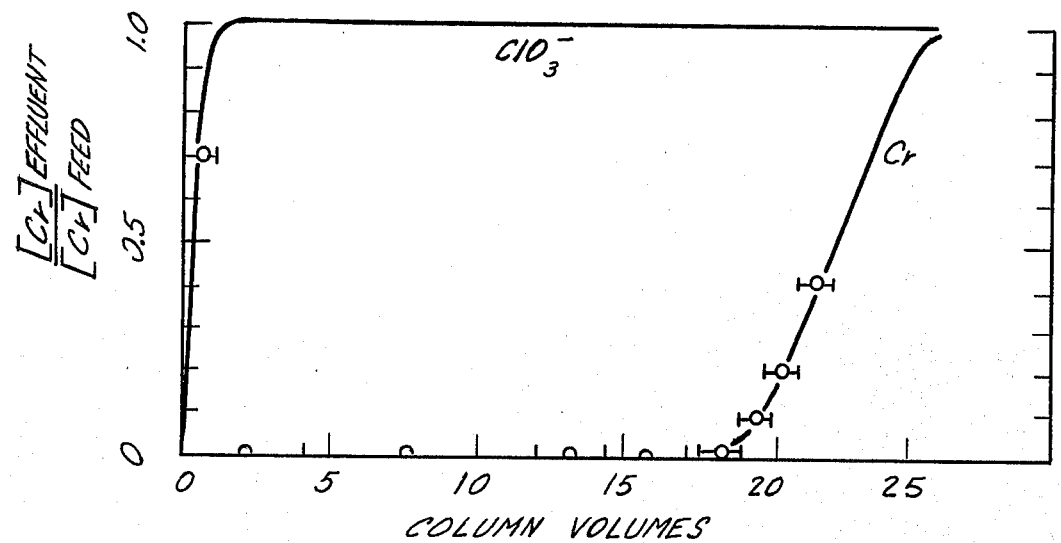
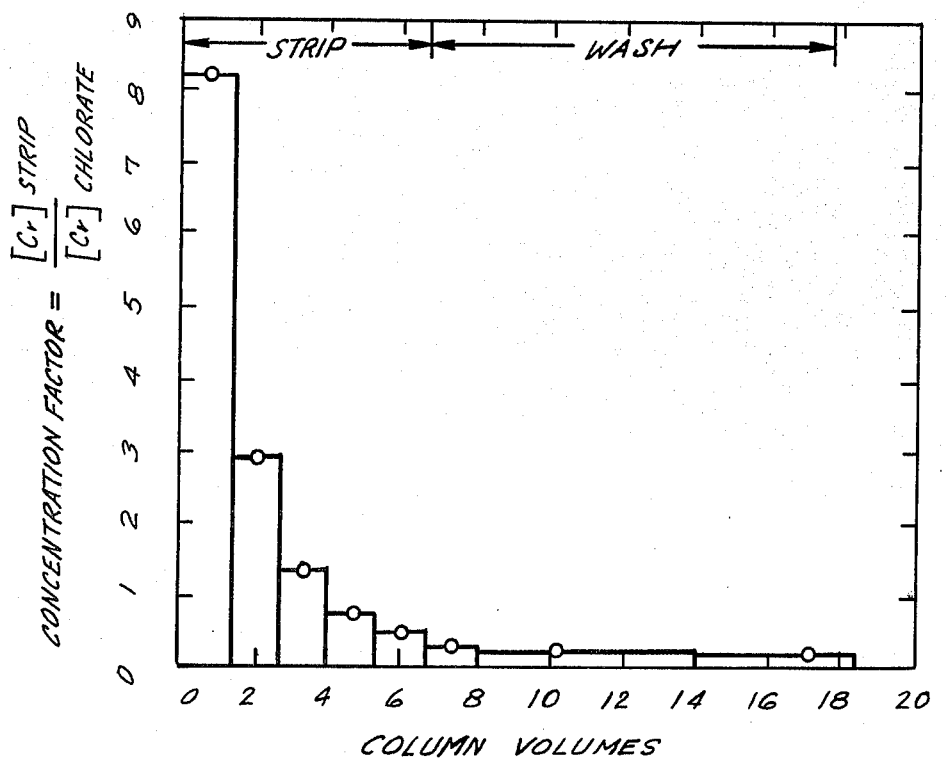
FIG. 2

PROCESS FOR REMOVING CHROMATE FROM SOLUTION

FIELD OF THE INVENTION

The instant invention relates to a process for removing chromium, e.g., as the chromate or dichromate ion, from a solution, e.g., an aqueous solution such as the chlorate containing effluent from the electrolytic manufacture of sodium chlorate from sodium chloride, plating solutions, cooling tower blowdown, etc.

CROSS REFERENCE TO RELATED APPLICATIONS

This patent application is related to U.S. patent application Ser. No. 214,812, filed Dec. 9, 1980 in the name of David J. Blumer and entitled "Process for Extracting Tungsten or Molybdenum from Solution" which discloses the preparation of the preferred or desired hydrous oxide of iron which is utilized as the absorbent in the process of the instant invention.

BACKGROUND OF THE PRIOR ART

Many processes are known in the art for removing chromium as a chromate or dichromate ion from water. Most of these processes use well known anion exchange resins due to the chromate and dichromate existing in the anion form. For example, in U.S. Pat. No. 3,664,950 an improved anion exchange process for removal of chromates from water is disclosed. The process utilizes a bed of basic anion exchange resin and the combination of upflow exhaustion of the chromates from the water and downflow regeneration of the resin. It is noted that unlike the absorbent utilized in the process of the instant invention, this strongly basic anion exchange resin which is disclosed in this reference, is clearly an organic material; such as the resins described at column 3, lines 20-23 of the patent. Furthermore, the patentee did not address himself to the problem of removing chromate or dichromate from the material which comprises a substantial amount of chlorate as a possible competing anion for the anion exchange resin.

The patentee of U.S. Pat. No. 3,835,001 teaches a process for adsorption of dichromate ions in the presence of chloride and chlorate ions. Again an organic resin (a strongly basic quaternary resin) is used as the adsorbent.

Various other patents disclose processes for removing chromium from aqueous solutions by means of a combination of anion and cation exchange. For example, see U.S. Pat. Nos. 3,885,018 and 3,903,237 which disclose a process wherein an aqueous hexavalent chromium-containing solution (in relatively low concentration) is concentrated by treatment first through a first cation exchange zone followed by treatment in an anion exchange zone. Again, the anion exchange resin which is utilized to separate the hexavalent chromium in its chromate anion form is exemplified by an organic material, i.e. a quaternary ammonium ion-containing material.

Other U.S. Patents which disclose the removal of chromate or the recovery of chromic acid from aqueous solutions include U.S. Pat. Nos. 4,049,772 and 4,145,281. Note in both of these patents the anion exchange material which is utilized to remove the chromic acid or chromate is disclosed to be an organic resin type. Note both of these patents are concerned with removal of chromate or chromic acid from plating bath and cooling tower blowdown water. In neither case would large amounts of chlorates be found in combination with the chromate, chromic acid containing solution.

An alternative process for removing chromium from polluted waters (which as taught, may originate from the use of chromium in plating baths) is by means of reacting soluble chromium with a sulfide in the presence of a water-soluble ferric salt to form a chromic sulfide precipitate.

In U.S. Pat. Nos. 3,332,737 and 3,382,034, it is taught that chromate may be removed from a solution by adsorption on a Group VI hydrous oxide ion exchanger. Although ferric oxide is mentioned in both of these patents as an adsorbent, there is no teaching that ferric oxide may be used to remove chromium as shown in the instant process.

In one article, James S. Davis, James O. Leckie, *Journal of Colloid and Interface Science*, Vol. 74, March, 1980, p. 32, it is disclosed that an adsorbent comprising Fe(O)OH may be used to adsorb chromates. However, the actual solutions tested contained only about 25 micrograms of chromium, an amount not sufficient to predict the efficacy of a process for the removal of the larger amounts of chromium found in solutions which are found in commerce (e.g. plating wastes, effluent from the electrolytic manufacture of chlorate from chloride, etc.) Moreover, as disclosed in another paper by the same authors, James A. Davis, James O. Leckie, *Journal of Colloid and Interface Science*, Vol. 67, October, 1978, p. 90, the adsorbent is an FeO(OH) gel, not the granular material utilized in the instant process.

The only commercially practiced process for chromium removal from chlorate-containing solutions is to precipitate the chromium as barium chromate and remove it by filtration. The barium process, however, has some undesirable characteristics. The chemical cost is high, caused in part by sulfates in the chlorate product. The chromium values are not recoverable for reuse. Also, in order to reduce the final chromium content below about 50 ppm, a substantial excess of barium must be added. The desired level of Cr is less than 10 ppm in the final product. Finally, disposal of the barium chromate sludge adds an additional cost.

BRIEF SUMMARY OF THE INSTANT INVENTION

The instant invention relates to a process for removing chromium, e.g., present as the chromate or dichromate anion from solution by contacting such solution with an adsorbent comprising a specific high-surface area hydrous oxide of iron. The high-surface area hydrous oxide of iron which is utilized in the process of the instant invention may be prepared by precipitation from an aqueous solution containing ferric nitrate or other fully dissociated iron salt by contacting said ferric nitrate with ammonium hydroxide or other weak base at certain critical conditions which are described below. The precipitate is an orange-reddish ferric hydroxide which is separated from the solution, washed with a minimum amount of water, dried at a temperature from about 60° to 150° C., and then gently ground to yield the adsorbent in the form of black granules.

The chromium is preferably in the anion form such as the chromate or the dichromate anion and is removed by adsorption at the surface of the insoluble high-surface area hydrous oxide. The chromium is found to be easily recoverable from such high-surface area hydrous oxide by contacting with an extraction solvent, comprising an aqueous solution which has a lower ionic strength than that of the solution from which said chromium containing anion is adsorbed. It is also beneficial if the pH of the extraction solvent is higher than the pH of the solution from which the chromium is adsorbed. The instant process is especially suitable for removal of chromate or dichromate from aqueous chlorate solutions which are effluent from the electrolytic process for manufacturing sodium chlorate from sodium chloride.

DETAILED DESCRIPTION OF THE INVENTION

Figure 3:
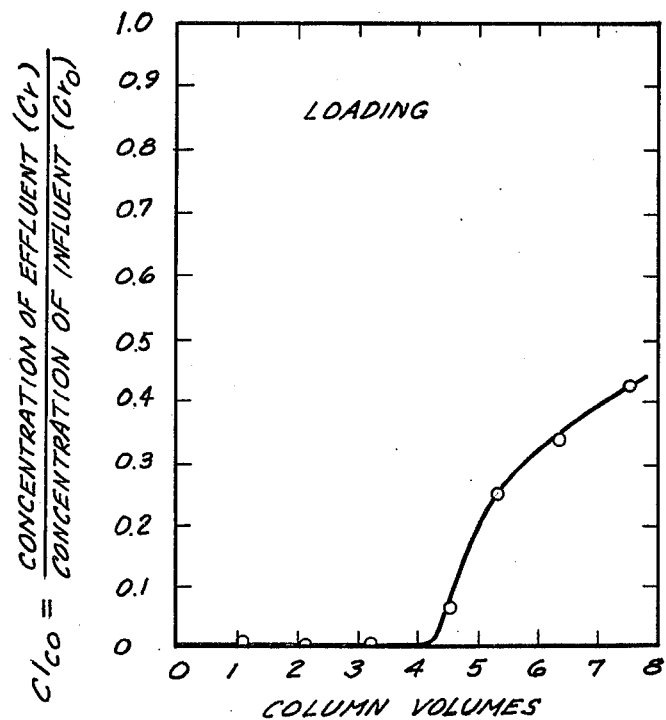

The instant invention relates to the process for the removal of chromium from a solution, preferably an aqueous solution containing chromium in the anion form by contacting such solution with an adsorbent comprising the hydrous oxide of iron described below. The invention is especially suited for removing chromium from solutions containing low concentrations of chromium in the presence of higher concentrations of anions, such as halides, (e.g., chloride) and oxyhalides (e.g., oxychlorides), etc. It is known in the art that in solutions of this sort it is difficult to selectively remove the chromium anions. The instant process is especially suitable for the removal of chromium from the effluent solution of an electrolytic process for the production of alkali metal chlorates, e.g., $NaClO_3$ from alkali metal chlorides, e.g., NaCl. In such electrolytic process, the chromium is used to stabilize the electrodes during the oxidation of the chloride to chlorate and is generally present in the effluent solution as the chromate or dichromate anion.

The pH of such effluent solutions is generally less than about 7, i.e. pH's of less than about 6 are frequently encountered in such effluent solutions.

The instant process may be operated in a cyclic mode utilizing the hydrous ion oxide adsorbent as a fixed bed. An aqueous sodium chlorate solution having a pH of about 5 or 6 and comprising up to about 2000 ppm chromium, e.g., from about 500 to about 1500 ppm chromium, in the anion form may be passed through an adsorption column comprising a fixed bed of such adsorbent until an increased chromium concentration (e.g., >2 ppm Cr) is detected in the substantially chromium-free sodium chlorate solution flowing from such adsorption column, thereby indicating that the chromium has broken through. In the above effluents, such chromium breakthrough may occur after about 5 volumes of chlorate solution volume of adsorbent or more has passed through said fixed bed. Chlorate solutions containing more than 2000 ppm Cr can be processed by the process of the instant invention although such concentrations are not commonly used in the manufacture of chlorate.

The adsorbed chromium may be removed from said adsorbent by passing an aqueous stripping solution through the chromium loaded fixed bed whereby the adsorbed chromium is dissolved in said stripping solution and said adsorbent is regenerated for use in the adsorption of chromium. This stripping solution should be lower in total ionic strength than the solution from which the chromium is adsorbed, e.g. the chlorate solution. A very dilute solution, or water alone, is effective. The adjustment of pH so as to be slightly above the pH of the solution from which the chromium is adsorbed (e.g. the chlorate solution) is beneficial.

The first volumes of stripping solution, e.g., the first few volumes per volume of adsorbent will comprise the majority of the adsorbed chromium, i.e. a solution containing about three times the concentration of chromium as was in the chlorate may be obtained by combining said first few volumes of said stripping solution. Such first volumes may be returned directly to the electrolytic process for the production of sodium chlorate. The subsequent volumes of stripping solution may be combined and used for subsequent stripping operations. Less water than is needed for chlorate production should be used for stripping. This keeps all of the chromium-containing water in the production and not in the plant effluents.

The instant adsorption process is effective for removing chromium from aqueous solution down to amounts of 2 ppm or less, even in the presence of the above noted halide and oxyhalide anions.

The adsorbent which is useful in the process of the instant invention comprises an iron compound such as represented by the general formula:

$$FeO(OH)$$

The adsorbent is a hydrous oxide of iron characterized as a granular, porous, high surface area, black material, which may be substantially non-crystalline and preferably has a substantially uniform distribution of substantially uniform size spherical pores, which are interconnected and therefore provide access by solutions to the interior of said adsorbent. Most preferably, the spherical pores will have a diameter of from about 320 to about 370Å. This adsorbent may be prepared by a critical preparation wherein specific ferric salts are precipitated from an aqueous solution by a specific type of base at carefully controlled conditions. The precipitate is washed and dried at controlled conditions to yield a friable material which may be gently crumbled to provide a particulate material at mesh size of $-20 +50$ or $-35 +100$. In this form it is suitable for use in a fixed bed adsorption process and will provide enhanced throughput as compared to other hydrous iron oxide and other adsorbents for chromium. The process of the instant invention is not limited by the size of the particles. The size of the particles are chosen to be compatible with the needs of process parameters such as flow rate and pressure drop through a column.

Of the various ferric salts which may be utilized in the preparation of the hydrous iron oxide adsorbent, it was found that ferric chloride and ferric sulfate, unlike ferric nitrate, did not give the desired adsorbent. It is believed that the chloride and sulfate ions tend to bind to the ferric ion fairly strongly in aqueous solution as compared to the nitrate. In some as yet not understood manner it appears that completely dissociated ferric salts, such as the nitrates, are critical to the preparation of the hydrous oxide of iron having the above-described properties. It was found that when ferric chloride and ferric sulfate were utilized, the precipitate upon drying was a reddish-brown colored material having virtually no particle integrity, thereby generating a large amount of fines and colloidal particles which decrease the throughput of an adsorption column comprising such hydrous iron oxide adsorbent.

While a precipitate of an iron salt from an aqueous solution can be obtained by use of virtually any base, it was discovered that the only bases capable of producing the desired hydrous iron oxide adsorbent was ammonium hydroxide and other weak bases. Strong bases, such as sodium hydroxide and potassium hydroxide, which were evaluated did not yield the desired adsorbent. These materials differ from weak bases in that they are completely dissociated in aqueous solution, however, such strong bases also differ from ammonium hydroxide in their approximate hydration numbers of 16.6 and 10.5, respectively. It is believed that the known ability of ammonium hydroxide and the like to form three dimensional structures in aqueous solutions (by cross-linking water molecules) act to provide the instant desired characteristics for the preferred hydrous iron oxide adsorbent.

It also has been found that if the base is added to the ferric nitrate over a period of more than, for example, an hour, undesirable crystalline products are obtained. Therefore, in preparing the desired hydrous oxide of iron disclosed herein the ammonium hydroxide or similar base should be added to the ferric nitrate solution and the solution be allowed to precipitate over a period of no more than about one hour.

It has also been found that due to the known tendency of colloids to aggregate in concentrated solutions the solutions utilized to precipitate the precursor to the desired hydrous iron oxide should be suitably dilute. For example, three molar solutions of ferric nitrate and ammonium hydroxide (which produced a black hydrous iron oxide upon drying) were less preferred in that the precipitate is brittle and crumbled and therefore could not be easily converted into the preferred adsorbent. On the other hand, when the ferric nitrate and the ammonium hydroxide were combined as one molar solution, the preferred hydrous iron oxide adsorbent was obtained. More dilute solutions would also be suitable, however, it would be less desirable from the standpoint of requiring the handling of large volumes of solution.

After precipitating the hydrous iron oxide from solution the precipitate should be washed to remove excess nitrate and ammonium ions from the precipitate before drying. It has been found, however, that where large amounts of wash water are used to wash the precipitate, peptization of the precipitate occurs on the filter resulting in the formation of colloidal particles which are difficult to filter. Besides the resulting loss in yields by the passage of said colloidal particles through the filter, the rate of filtration is decreased. Preferably, the precipitate should be washed with no more than about 5, more preferably no more than about 3 volumes of water, per volume, of precipitate.

The desired precipitate which is the precursor to the instant novel hydrous iron oxide adsorbent is a reddish-brown material which if allowed to air dry at room temperature will form an admixture of the preferred hydrous iron oxide adsorbent and the reddish-brown ferric hydroxide. Air drying will in addition take several weeks for completion. It has been found that preferably when the precipitate is dried between 60° and 150° C. the preferred adsorbent is obtained. Finally, the dry precipitate must be broken down into smaller particles preferably of uniform size so that utilization in a column comprising a fixed bed of said adsorbent will show good flow and fluid contact characteristics. The dried precipitate is surprisingly hard and brittle, i.e. friable. If the precipitate is ground to dust with a mortar and pestle, the resulting material is actually reddish-brown colored rather than black, suggesting that a black color is an optical adsorption effect of the particles themselves. That is, light impinging on the surface is entirely adsorbed with virtually no reflected light. In breaking the dried precipitate into smaller particles the production of fines must be avoided since they contribute in low flow rates in columns as well as cause high pressure drops. It has been found that the dry precipitate may be conveniently ground, by gentle hand grinding or by means of a roll crusher, to a particle size of $-35+100$ mesh to obtain a material suitable from the standpoint of both rate of adsorption of chromium and the flowthrough of the chromium-containing solution.

It is found that the surface area of the hydrous iron oxide utilized in the instant process is important in relationship to the capacity of such hydrous iron oxide adsorbent for chromium. In general, the hydrous iron oxides disclosed herein will have a surface area as measured by the BET method of from about 80 to about 500 $(m^2/mg)$.

The above described hydrous oxide may have a capacity from about 0.1 to about 100, preferably from about 1 to about 25 milligrams of chromium per gram of hydrous iron oxide. The contacting of the chromium containing solution with the hydrous iron oxide adsorbent may take place at ambient temperature and pressure conditions, however, temperatures of from the freezing point up to the boiling point of such chromium-containing solutions may be utilized. The temperature desired will be dictated by the choice of where the invention is practiced. Depending on the temperature of operation of the chlorate cell or the position of the Cr recovery step in the process, different temperatures are preferred. The adsorbent has higher capacity at higher temperature. For example, for a solution containing 745 mg/1 Cr, chromium breakthrough at about 60° C. is at about 17 volumes of solution/volume of adsorbent, and the capacity is 9.22 g of chromium per kg of adsorbent; while adsorption at 25° C. shows chromium breakthrough at 10 volumes and the capacity is 5.3 g of chromium per kg of adsorbent.

Contacting may take place for from about 1 to about 1000 minutes, preferably from about 1 to about 60 minutes, and generally until a substantial portion of the capacity of the hydrous iron oxide absorbent is utilized.

In general, the adsorption will be continued until the chromium concentration of the solution flowing from the adsorbent begins to increase.

Contacting of the chromium-containing solution and the adsorbent may take place at elevated pressures and if desirable under vacuum provided the chromium-containing solution does not freeze nor boil at the pressures selected. In general, atmospheric pressure will be suitable for such adsorption process.

In the cyclic, fixed-bed process described above, the chromium-containing solution, depleted in chromium may be separated from the hydrous iron oxide adsorbent containing adsorbed chromium and such chromium-loaded hydrous iron oxide adsorbent may then be contacted with stripping solution to strip the chromium therefrom. In general, a solution lower in ionic strength and having a higher pH is utilized to remove the chromium from the adsorbent, i.e. the pH of the stripping solution should be greater than the pH of the solution from which the chromium was originally adsorbed. A suitable pH for such stripping solution is about 7. A typical stripping solution may comprise up to about 1000 milligrams NaOH per liter.

It is surprising that the change in ionic strength allows the stripping of the adsorbed chromium from the adsorbent to the effected. This demonstrates that the counter ions of the chromate are co-adsorbed with the chromate. Thus this process is not an ion exchange process, but an adsorption of the salt sodium chromate at high ionic strength and desorption of the salt at low ionic strength. Such behavior can be qualitatively accounted for by double layer theory of aqueous solution-solid interfaces. While not wishing to be bound by theory it is believed that protons or hydroxyl ions determine the surface of the hydrous iron oxide in aqueous suspension. Thus, the pH of the medium determines whether the surface is positively charged or negatively charged. The zero point of charge (ZPC) in a hydrous iron oxide such as geothite is about pH 7.4. Further, the intensity of the surface charge is dependent on the ionic strength of the medium.

The surface charges are believed to be formed by the following reactions: The symbol Fe indicates a surface ferric ion.

below ZPC

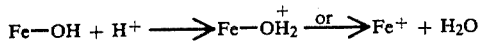

above ZPC

Thus below the zero point of charge (ZPC) in acid media, protonated sites or coordinatively unsaturated ferric sites are formed. The lower the pH and the higher the ionic strength, the more sites and the more favorable the situation is for adsorption of a negative ion, and the higher the ionic strength, the more favorable is the co-adsorption of the counter ion in the double layer.

The adsorption site for chromiuim anions is believed to be these exposed ferric ions on surface. Such a surface reaction would explain very high selectivity of the preferred hydrous iron oxide adsorbent (described above) for chromate in the presence of much larger concentrations of other anions in a sodium chlorate solution.

Above the ZPC, the surface charge is reversed. The ferric sites react with water and/or hydroxide to form a negatively charged surface—a situation favorable for desorption of a negative ion. Also, low ionic strength favors desorption of the salt.

The sodium chlorate solution effluent from the herein described electrolytic process has a very high ionic strength and a pH 5–6, the preferred hydrous iron oxide has a positive surface charge. Thus, adsorption of the chromate salt is favored. Measurements indicate that the zero point of charge of such hydrous iron oxide is about pH=7. Like geothite it has a positive surface charge at lower pH and a negative charge at higher pH. Thus desorption of chromium anion containing salt is effected.

The present invention also provides a process for concentrating a dilute salt solution of chromium, i.e. the stripping solution may have a much lesser volume than the solution from which the chromium is originally adsorbed. Concentrations of at least about 2 gms/liter may thus be obtained by the process of the instant invention from solutions containing from 2 to about 2000 mg chromium per liter.

This high concentration factor achieved is especially surprising in view of the ease of stripping the adsorbed chromium from the adsorbent.

The chromium is stripped from the column by water. A trace of NaOH—less than 100 ppm—is desirable to shift the surface charge of the adsorbent, but is not necessary. Sometimes it will be preferred to use waste water which already contains some chromium VI for stripping. Such a use results in reclaiming the chromium values for production use. Often such waste water also contains some salts. In a chlorate plant, these salts are mostly chloride and chlorates. The presence of the chloride and chlorate salts does not adversely affect the stripping reaction until the concentration of salts is above about 50% of their maximum solubility at the temperature of the stripping solution. FIG 3 represents desorption data for 25° C. in histogram form. The average chromium concentration factor of the strip liquor over a full column volume is plotted as a function of the number of column volumes of effluent.

The concentration factor is the ratio of the chromium concentration in the stripping solution to the chromium concentration present initially in the sodium chlorate solution. The concentration factor initially is quite high and drops off rapidly. The maximum concentration factor is about 10. The first four volumes of stripping solution/volume of adsorbent represents the stripping portion of the desorption step has been found (when combined) to yield a stripping solution containing 90% of the recovered chromium at 1.7 to 1.8 g/l, and thus is suitable for return to the sodium chlorate production process.

The stripped adsorbent may then be washed with an aqueous solution prior to returning said adsorbent to use in adsorption of chromium.

The next four volumes of washing solution/volume of adsorbent will remove residual chroumium from the adsorbent and will produce a wash solution containing less than 250 mg Cr/l. This wash solution may be held for use in subsequent stripping of the chromium-loaded adsorbent.

There is some flexibility in selecting the transition point from stripping to washing. An earlier transition results in a higher chromium concentration but a lower overall chromium recovery. The converse is true for a later transition. The only limitation is on the total volume of stripping solution and washing solution used. Preferably, such total volume will not exceed the volume of water contained in the substantially chromium-free chlorate solution recovered as outflow from the fixed-bed of adsorbent.

There is relatively little effect of temperature on desorption of chromium from the adsorbent. Temperatures of from the freezing point to the boiling point of the stripping solution may be utilized. For example, ambient temperature, i.e. about 25° C. is suitable. In a cyclic process wherein both adsorption and stripping take place at higher temperature higher concentrations of chromium during the stripping may be obtained. This is due primarily to higher chromium loading resulting from adsorption at higher temperatures.

The following comprise the Preferred Embodiment and specific examples of the process of the instant invention, however there is no intention that the claims be limited thereto.

The following discusses the Preferred Embodiment of the instant invention, i.e. in the above described electrolytic process for the preparation of sodium chlorate from sodium chloride wherein chromium compounds are utilized to stabilize the electrodes.

In a typical process to prepare sodium chlorate, hypochlorite is formed in an electrochemical cell without a diaphram and the cell effluent goes to a reactor or holding tank where the hypochlorite converts to chlorate and chloride. This effluent solution from the reactor is heated to decompose most of the remaining hypochlorite. The heated effluent is passed to a tank where any residual hypochlorite is destroyed with chemical reductants such as urea or sulfite. The composition of the sodium chloride product (after treatment with such chemical reductants) is adjusted with sodium chloride and the final (adjusted) product sent to storage. The final product may be filtered if necessary. Chromium removal by the process of the instant invention can be practiced at any point along this path after the reactor or holding tank where the hypochlorite is converted to chlorate and chloride.

EXAMPLE 1

An aqueous solution of sodium chlorate is prepared by the electrolysis of sodium chloride in a manner similar to the above description. Residual hypochlorite is decomposed and the solution resaturated with sodium chloride to produce a solution designated R2. The major components of this solution are as follows:
350 g/l sodium chlorate
200 g/l sodium chloride
745 mg/l chromium (VI).

To a jacketed column approximately 7 mm by 30 mm, is charged 10.5 g of the adsorbent prepared in accordance with the disclosure. Thermostated water at 60° C. is circulated through the jacket. The R2 solution is pumped through the column at a rate of about 1.5 ml/min. The effluent from the column is sampled and analyzed for chromium periodically. The results of this experiment are plotted in FIG. 1, the concentration history diagram. After complete loading (as shown by the ratio of chromium in the effluent to chromium in the feed reaching about 1.0) an aqueous solution (stripping solution) containing 100 parts per million sodium hydroxide is pumped through the column for about 6 column volumes followed by water for the remaining column volumes. The effluent again sampled periodically and analyzed for chromium. The results of this part of the experiment are shown in FIG. 2. This experiment demonstrates that the chromium can be separated from the chlorate solution and subsequently stripped from the adsorbent in an aqueous solution containing alkaline hydroxide. Sodium chloride may be dissolved in the chromium-containing stripping solution and the resulting solution utilized as the feedstock solution for the preparation of sodium chlorate.

EXAMPLE 2

Figure 4:
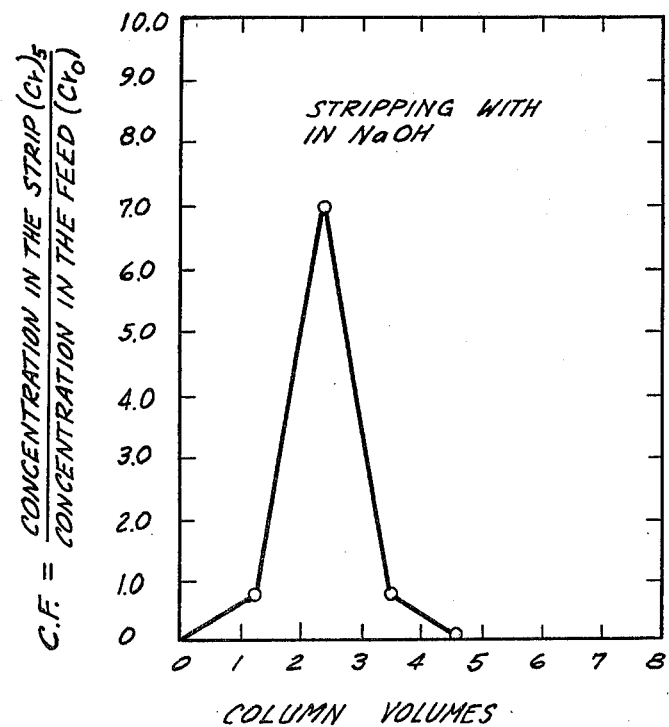

A dragout solution from a plating operation containing about 700 mg/l chromium was pumped through the column as in the above example. The effluent from the column was sampled periodically and each sample analyzed for chromium content. The effluent was water-white and free from chromium for 4 column volumes at which point chromium breakthrough occurred. This data is presented in FIG. 3, concentration history diagram. The loaded column was stripped of adsorbed chromium by passing an aqueous solution containing 40 g/l sodium hydroxide through the column. The effluent was sampled periodically and analyzed for chromium content. The results of this part of the experiment are presented in FIG. 4. This experiment demonstrates the removal of chromium from a plating waste solution and the recovery of chromium is a concentrated form for reuse in the plating process. It also demonstrates the adsorption of Cr from a relatively low ionic strength media and its desorption by an ion exchange mechanism.

What is claimed is:

1. A process for removing dissolved chromium in the form of chromate or dichromate ions from an aqueous solution containing from about 50 to about 2000 mg/liter of dissolved chromium, and in addition to chromium, sodium chlorate, sodium hypochlorite and sodium chloride, which comprises contacting said solution with an adsorbent of formula FeO(OH) at conditions whereby said chromium is adsorbed on said adsorbent, wherein said adsorbent is a granular, porous, high surface area, black material prepared by a process which comprises precipitating FeO(OH) from an aqueous solution containing ferric nitrate by contacting said solution with ammonium hydroxide, removing said precipitate from said aqueous solution, drying said precipitate, and grinding said dried precipitate to obtain a coarse powder.

2. The process of claim 1 wherein said precipitate is dried at a temperature of from about 60° to about 150° C.

3. A method for removing dissolved chromium from the effluent of an electrolytic process for making chlorate from sodium chloride wherein said dissolved chromium is selected from the group consisting of chromate ions, dichromate ions, and mixtures thereof, and wherein said effluent contains from about 50 to about 2000 mg. per liter of dissolved chromium, which method comprises the steps of:

(a) contacting said effluent with an adsorbent comprising a hydrous oxide of iron of formula (FeO(OH) at conditions suitable to adsorb said dissolved chromium on said adsorbent, said FeO(OH) being precipitated from an aqueous solution of ferric nitrate by contacting said ferric nitrate-containing solution with ammonium hydroxide;

(b) adsorbing said dissolving chromium on said adsorbent to provide a chromium-loaded adsorbent and a chromium-depleted effluent; and (c) separating said chromium-loaded adsorbent from said chromium-depleted effluent, whereby said dissolved chromium is removed from said effluent.

4. A method of claim 3 wherein said alkali metal comprises sodium.

5. The method of claim 4 wherein said effluent is contacted with said adsorbent at a temperature of at least about 60° C. or higher.

6. The method of claim 5 further comprising stripping said adsorbed chromium from said separated, chromium-loaded adsorbent comprising the steps of:

(d) contacting said separated, chromium-loaded adsorbent with an aqueous stripping solution at conditions suitable to desorb said chromium from said chromium-loaded adsorbent.

(e) desorbing said chromium from said chromium-loaded adsorbent to provide a chromium-loaded stripping solution and a regenerated adsorbent comprising a substantially chromium-free hydrous oxide of iron, and (f) separating said chromium-loaded stripping solution from said substantially chromium-free hydrous oxide of iron.

7. The method of claim 6 wherein said effluent has a pH of less than about 7 and said stripping solution has a pH of greater than the pH of said effluent.

8. The method of claim 6 wherein said stripping solution comprises at least about 10 ppm of sodium hydroxide.

9. The method of claim 6 wherein said effluent is contacted with said adsorbent by passing said effluent through a fixed-bed of said adsorbent at a flow rate of at least about 0.5 gal/min/ft$^3$.

10. The method of claim 8 wherein said effluent is contacted with said adsorbent until from about 4 volumes of effluent/volume of adsorbent to 20 volumes of effluent/volume of adsorbent is passed through said fixed-bed of adsorbent.

11. The method of claim 9 further comprising increasing the concentration of said dissolved chromium in said stripping solution over said effluent by the step of:

(g) recovering no more than the first 10 volumes of stripping solution solution/volume of chromium-loaded adsorbent to thereby recover a stripping solution having a concentration of dissolved chromium greater than the concentration of dissolved chromium in said effluent.

12. The method of claim 4 further comprising the step of:

(h) recycling said stripping solution of step (g) to said electrolytic process.

13. The process of claim 3, wherein said hydrous oxide of iron is a granular, porous, high surface area, black material having the formula FeO(OH).

14. A process for removing a dissolved chromium compound selected from the group consisting of Group Ia alkali metal chromate, dichromate, and mixtures thereof from a first aqueous solution comprising contacting said first aqueous solution with a hydrous oxide of iron sorbent under conditions operable to sorb said chromium compound on said sorbent, said sorbent being a granular, porous, high surface area, black material operable for sorbing said chromium compound, and wherein said first aqueous solution comprises a dissolved chlorate compound in a much greater concentration than the concentration of said dissolved chromium compound, said sorbent being operable to selectively sorb a much greater percent of said chromium compound than said chlorate compound from said first aqueous solution, and further comprising sorbing a much greater percent of said chromium compound from said first aqueous solution by said sorbent than the percent of said chlorate compound sorbed from said first aqueous solution by said sorbent.

15. The process of claim 14, further comprising separating said sorbent containing said chromium compound from said contacted aqueous solution, and contacting said separated sorbent with a second aqueous solution having a smaller concentration of said chromium compound dissolved therein than the concentration of said chromium compound dissolved in said first aqueous solution, under conditions operable to produce a third aqueous solution having a higher concentration of said chromium compound than the concentration of said chromium compound in said first aqueous solution.

* * * * *